(12) United States Patent
St-Denis et al.

(10) Patent No.: US 11,876,726 B2
(45) Date of Patent: Jan. 16, 2024

(54) DISABLING CUT-THROUGH FRAME TRANSFER BASED ON A CYCLE TIME PERIOD AND APPARATUS FOR DISABLING

(71) Applicant: NXP B.V., Eindhoven (NL)

(72) Inventors: Bernard Francois St-Denis, Ottawa (CA); Sathish Vallipuram, Ottawa (CA)

(73) Assignee: NXP B.V., Eindhoven (NL)

( * ) Notice: Subject to any disclaimer, the term of this patent is extended or adjusted under 35 U.S.C. 154(b) by 32 days.

(21) Appl. No.: 17/653,801

(22) Filed: Mar. 7, 2022

(65) Prior Publication Data

US 2023/0283565 A1 Sep. 7, 2023

(51) Int. Cl.
*H04L 47/56* (2022.01)
*H04L 49/25* (2022.01)

(52) U.S. Cl.
CPC ............ *H04L 47/56* (2013.01); *H04L 49/251* (2013.01); *H04L 49/252* (2013.01)

(58) Field of Classification Search
CPC ...... H04L 47/56; H04L 49/251; H04L 49/252
See application file for complete search history.

(56) References Cited

U.S. PATENT DOCUMENTS

| | | | |
|---|---|---|---|
| 9,450,894 B2 | 9/2016 | Edmiston | |
| 10,862,802 B1* | 12/2020 | Subramanian | ...... H04L 12/4645 |
| 2006/0155938 A1* | 7/2006 | Cummings | ......... H04L 49/103 |
| | | | 711/149 |
| 2011/0026538 A1* | 2/2011 | Takeuchi | ............. H04L 49/351 |
| | | | 370/401 |
| 2019/0007344 A1* | 1/2019 | Mangin | ............... H04L 47/6275 |
| 2020/0099626 A1* | 3/2020 | Yoneda | ................. H04L 49/251 |
| 2022/0046567 A1* | 2/2022 | Kahn | .................. H04W 56/005 |

FOREIGN PATENT DOCUMENTS

EP    1662725 B1    5/2006

OTHER PUBLICATIONS

IEC, "International Standard; IEC 61158-5-10; Industrial communication networks—Fieldbus specifications—Part 5-10: Application layer service definition—Type 10 elements," Edition 4.0, Apr. 2019, 634 pages.
IEEE 802.1Q-2018, "IEEE Standard for Local and Metropolitan Area Networks—Bridges and Bridged Networks," May 7, 2018, (Revision of IEEE Std 802.1Q-2014), 1993 pages.
IEEE Std 802.1Qbv™-2015, "IEEE Standard for Local and metropolitan area networks—Bridges and Bridged Networks Amendment 25: Enhancements for Scheduled Traffic," Dec. 5, 2015, 57 pages.
IEEE P802.1Qci/D2.1, "Draft Standard for Local and Metropolitan Area Networks—Bridges and Bridged Networks—Amendment: Per-Stream Filtering and Policing," Nov. 15, 2016, 62 pages.

\* cited by examiner

*Primary Examiner* — Luat Phung

(57) ABSTRACT

Cut-through frame transfer or store-and-forward frame transfer of a frame in an network switch is disclosed. A frame is received from an input port of the switch. A time period in a cycle time when the frame is received and a stream identification of the frame is determined. One of the cut-through frame transfer and the store-and-forward frame transfer of the frame is performed based on the time period in the cycle time when the frame was received and the stream identification.

14 Claims, 4 Drawing Sheets

US 11,876,726 B2

DISABLING CUT-THROUGH FRAME TRANSFER BASED ON A CYCLE TIME PERIOD AND APPARATUS FOR DISABLING

FIELD OF USE

This disclosure generally relates to local area network communication based on time sensitive networking (TSN), and more particularly to disabling cut-through frame transfer based on a cycle time period.

BACKGROUND

Time sensitive networking (TSN) offers a determinism in communication over IEEE 802.1 local area networks including guaranteed end-to-end latencies, limited latency fluctuations (jitter), and low frame loss. IEEE 802.1Q-2018 which incorporates IEEE 802.1Qci and IEEE 802.Qbv define TSN. IEEE 802.1Q-2018 describe operation of bridges and bridged networks of local area networks. 802.1Qci describes a per stream filterer and policer which filters and polices streams of frames to detect and mitigate disruptive transmissions in the network. IEEE 802.1Qbv describes a time gated scheduler which makes decisions when to schedule frames for transmission based on a priority of the frames in the streams. A network switch which supports TSN has a per stream filterer and policer (PSFP), a forwarder, and the time gated scheduler. The forwarder between the PSFP and time gated scheduler makes a forwarding decision for a frame output by the PSFP. The forwarder forwards the frame to the time gated scheduler based on one of two modes. In store-and-forward mode, the forwarder receives and stores the entire frame before enqueuing the frame to a queue of the time gated scheduler and output port. In cut-through frame transfer mode, the forwarder receives a fraction of the frame and immediately makes a forwarding decision to enqueue the frame to a queue of the time gated scheduler and output port before the entire frame is received. Cut-through frame transfer reduces latency through the network switch and is typically performed when an ingress port speed of the network switch is greater than or equal to an egress speed of the network switch.

Figure 1:
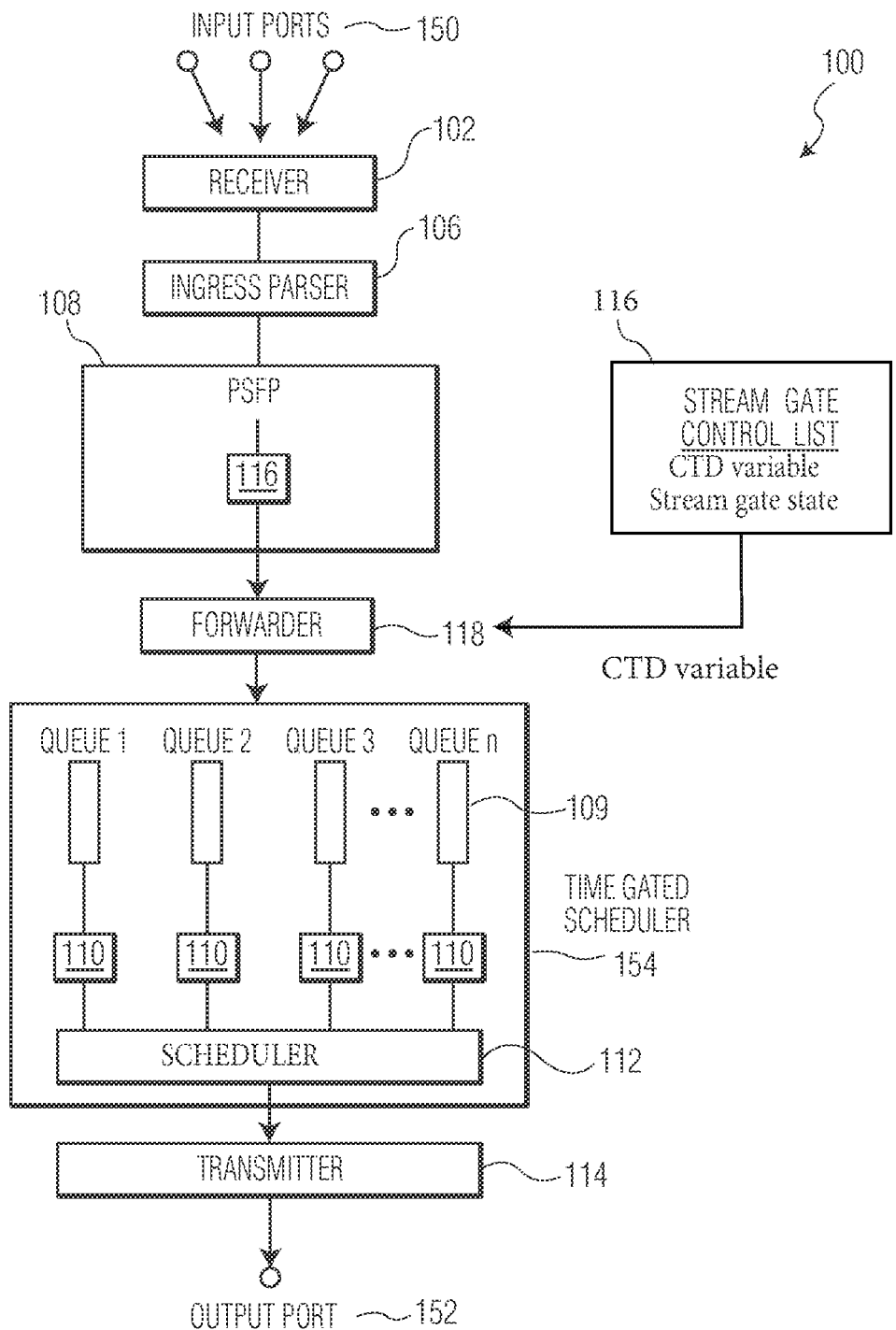
FIG. 1 is a block diagram of an example network switch arranged to perform time sensitive networking (TSN) in accordance with an embodiment.

The drawings are for the purpose of illustrating example embodiments, but it is understood that the embodiments are not limited to the arrangements and instrumentality shown in the drawings.

DETAILED DESCRIPTION

A cycle time in a network switch is subdivided into a plurality of time periods. In each time period, a stream gate state of a Per-Stream Filtering and Policer (PSFP) is open or closed to indicate whether a frame of a stream received in the time period from an input port of the network switch is output to a forwarder of the network switch. If the stream gate state is closed, the PSFP discards the frame. If the stream gate state is open, the PSFP outputs the frame to the forwarder. The forwarder enqueues the frame on a queue of a time gated scheduler for transmission over an output port of the network switch based on one of a store-and-forward frame transfer or cut-through frame transfer. In a store-and-forward frame transfer, the forwarder will receive the entire frame and store an indication of an actual length of the frame as metadata of the frame. The forwarder then enqueues the frame in a queue of the time gated scheduler for transmission. In a cut-through frame transfer, the forwarder will receive a portion of the frame and then begin queuing the frame in a queue of the time gated scheduler while the forwarder is continuing to receive the frame and before an actual length of the frame is known. A time gated scheduler schedules the frame for transmission if a priority gate state remains open long enough in the cycle time to transmit at a transmit rate the frame with the actual length in a store-and-forward frame transfer or to transmit at a transmit rate the frame with a presumed maximum length in a cut-through frame transfer. Otherwise, the frame is scheduled for transmission in a next cycle time.

Embodiments disclosed herein are directed to disabling a cut-through frame transfer of a frame to the time gated scheduler based on a time period in the cycle time when the frame is received from the input port of the network switch. The network switch has a stream gate control list which indicates whether the stream gate state of the PSFP is open or closed in each time period of the cycle time for a frame of a stream. Further, the stream gate control list maintains a state variable referred to as cut-through disable variable (CTD) to indicate whether cut-through frame transfer is disabled for the frame in the time period. If stream gate state for a stream is open during the time period when a frame of the stream is received and the CTD variable is set to a predetermined value during the time period when the frame is received, then cut though frame transfer is disabled implying store-and-forward frame transfer of the frame by the forwarder to a queue of the time gated scheduler. If the CTD variable is not set to a predetermined value during the time period when the frame is received, then cut through frame transfer is allowed implying cut-through frame transfer or store-and-forward frame transfer of the frame by the forwarder to a queue of the time gated scheduler. The time gated scheduler then schedules the frame for transmission over an output port of the network switch. Based on a setting of the CTD variable, the forwarder allows cut-through frame transfer or only store-and-forward frame transfer. In examples, the CTD variable is set in one or more time periods of the cycle time to improve chances that the time gated scheduler will be able to schedule a frame for transmission in a same cycle time and not in a next cycle time improving network switch throughput. Well known instructions, protocols, structures, and techniques have not been shown in detail in order not to obfuscate the description.

Example Systems

FIG. 1 is a block diagram of an example network switch 100 arranged to perform time sensitive networking (TSN) in accordance with an embodiment. The network switch 100 facilitates transfer of packets between devices on IEEE 802.1 local area networks. TSN offers a determinism in communication over the IEEE 802.1 local area networks including guaranteed end-to-end latencies, limited latency fluctuations (jitter), and low frame loss. The network switch 100 comprises a plurality of input ports 150 and a plurality of output ports, one of which is shown as output port 152. The input ports 150 and the output port 152 may be coupled to a communication channel of the local area network (not shown). Further, the input ports 150 and the output port 152 may be coupled to a receiver 102 and a transmitter 114 respectively of the network switch 100. The network switch 100 may also include an ingress parser 104, a per stream filterer and policer (PSFP) 106, a forwarder 118, a time gated scheduler 154, and a transmitter 114. In examples, the forwarder 118 may be in communication with a plurality of instances of the time gated scheduler 154 associated with different ports, one of which is shown in FIG. 1. Components of the network switch 100 and other components shown or not shown may be each implemented using circuitry such as analog circuitry, mix signal circuitry, memory circuitry, logic circuitry, processing circuitry arranged to execute code stored in a memory and when executed by the processing circuitry perform the disclosed functions, or combinations thereof.

The network switch 100 may determine whether to transmit a frame of a stream of frames received at one or more input ports of the plurality of input ports 150 to an output port 152. Processing of the receiver 102, ingress parser 104, PSFP 108, forwarder 118, time gated scheduler 154, and transmitter 114 may facilitate this determination.

In an example, the plurality of input ports 150 may be coupled to the receiver 102. The receiver 102 may receive a frame. The receiver 102 may assign a timestamp to the received frame stored as metadata to the frame which indicates a time when the frame was received. The metadata may be a data structure associated with the frame stored in a memory of the network switch 100. In an example, the network switch 100 may have a running timer such as an IEEE 1588 timer to determine the time when the frame is received and a timestamp circuit which outputs a timestamp indicative of the time of the timer when the network switch 100 received the frame. The receiver 102 may provide the frame to the ingress parser 104 which parses one or more fields in the frame. In an example, the ingress parser 104 may identify one or more of a media access control (MAC) address in the frame such as a source address (SA) and destination address (DA) in an Ethernet header of the frame and a virtual local area network (VLAN) header. In an example, the VLAN identifier may identify a priority of the frame to achieve a certain quality of service (QoS) of the frame. The priority of the frame may indicate whether the frame is a high priority frame which should be transmitted with low latency or a low priority frame which may be transmitted with higher latency. The MAC address may identify the stream associated with the frame and frames with a same SA and DA may be associated with a same stream. The priority and the stream identification may be stored as metadata of the frame. In some examples, frames received by any of the input ports 150 may have a same stream identification.

The PSFP 108 may receive the frame from the ingress parser 106 and use the identification of the stream and the timestamp of the frame to determine whether to output the frame to the forwarder 118. Functions of the PSFP 108 is based in part on IEEE 802.1Qci which is incorporated into IEEE 802.1Q-2018 to define TSN. IEEE 802.1Q describe operation of bridges and bridged networks of local area networks. 802.1Qci describes a Per-Stream Filtering and Policing (PSFP) which filters and polices streams of frames to detect and mitigate disruptive transmissions in the network. The PSFP 108 may have a stream gate control list 116 which indicates for a stream a stream gate state for each time period of the cycle of time. In an example, different stream gate control list 116 may be associated with different streams. The stream gate state may have an open state or closed state. In an example, the PSFP 108 may access the stream gate control list 116 to determine a stream gate state based the time of the timestamp when the frame is received and the stream identification. The stream gate state may be open or closed. If the stream gate state is closed for the frame, then the frame may not be output to the forwarder 118 and the frame is dropped or discarded. If the stream gate state is open for the frame, then the frame may be output to the forwarder 118.

The forwarder 118 may determine an output port which is to transmit the frame. In an example, the output port may be identified based on the MAC DA. The forwarder 118 may then enqueue the frame on a queue 109 of the time gate scheduler 154 associated with the port output 152. Each queue 109 may store frames of a certain priority. The forwarder 118 may use the priority of the frame to determine the queue 109 to which the frame is enqueued and the frame may be enqueued based on one of two forwarding modes, referred to as a store-and-forward mode or cut-through frame transfer mode.

In store-and-forward mode, the forwarder 118 receives and stores the entire frame output by the PSFP 108. After storing the entire frame, the forwarder 118 then enqueues the frame in a queue 109 of the time gated scheduler 154 associated with the output port 152. In an example, each queue 109 may store frames associated with a similar priority and the forwarder 118 may enqueue the frame in a queue 109 associated with the priority of the frame. In store-and-forward mode, an actual length of the frame is known before the frame is enqueued. The actual length is saved as metadata of the frame in a memory of the network switch 100.

In cut-through frame transfer mode, the forwarder 118 receives a portion of the frame output by the PSFP 108. The portion may include the MAC source address, MAC destination address, and VLAN identifier fields of the frame sufficient for the forwarder 118 to identify the output port 152 for the frame based on at least the MAC DA and queue 109 based on at least the VLAN identifier. In a cut-through transfer, the forwarder 118 will then begin queuing the frame in a queue 109 of the time gated scheduler 154 while the forwarder 118 is receiving the frame output by the PSFP 108. The length of the frame may not be known before the forwarder 118 begins enqueuing. Cut-through frame transfer reduces latency through the network switch 100 and is typically performed when an ingress port speed of the network switch 100 is greater than or equal to an egress speed of the network switch.

Processing of the time gated scheduler 154 may be also based on 802.1Q-2018 which incorporates IEEE 802.1Qbv. IEEE 802.1Qbv defines Enhancements for Scheduled Traffic (EST) including making decision whether to transmit frames based on a frame priority. The time gated scheduler 154 may have a priority gate queue state 110 for each queue with an open or closed state which indicates whether a frame in a queue 109 may be scheduled for transmission or not. In one example, the priority gate queue state 110 of a queue 109 may be closed in which case the scheduler 112 is not able to select a frame in the queue 109 for scheduling. When the priority gate queue state 110 for a queue 109 is open, the scheduler 112 may select a frame in the queue 109 to be scheduled for transmission if the entire frame may be transmitted by the output port 152 before the priority gate queue state 110 closes. Further, if two or more priority gate queue states 110 are open at a same time, then the scheduler 112 may select which frame in a queue 109 to schedule for transmission based on a priority of the frames in each of the associated queues. The priority gate queue state 110 may be open or closed over time for each queue 109 and the scheduler 112 may schedule frames so that the frames of each queue 109 are transmitted by the transmitter 114 to the output port 114 in accordance with its priority to meet a certain quality of service (QOS) associated with the frame. Further, the scheduler 112 schedules the frame for transmission if the priority gate queue state 110 remains open long enough in the cycle time for the frame with the determined length to be transmitted in a store-and-forward frame transfer or for the frame with the presumed maximum length to be transmitted in a cut-through frame transfer. Otherwise, the frame may be scheduled for transmission in a later cycle time.

Embodiments disclosed herein are directed to disabling a cut-through frame transfer of a frame based on a time period in a cycle time when the frame is received by the receiver 102. The disabling of the cut-through frame transfer reduces chances that the forwarder 118 enqueues a frame on a queue 109 and the time gated scheduler 154 is not able to schedule the frame for transmission in the cycle time. In each time period, the stream gate state of the PSFP 108 is open or closed for the received frame. The stream gate control list 116 may maintain a state variable referred to as cut-through disable (CTD) to indicate whether cut-through frame transfer by the forwarder 118 is disabled for the frame in the time period. The PSFP 108 may determine based on the timestamp of the frame in which time period of the cycle time the frame was received. If the stream gate state for the frame is open during the time period when the frame is received and the stream gate control list 116 indicates that the CTD variable is set to a predetermined value during the time period when the frame is received, then cut though frame transfer is disabled. The PSFP 108 may associate the setting of the CTD variable with the frame as metadata of the frame stored in the memory of the network switch 100. The forwarder 118 may then receive at least a portion of the frame to identify the frame and CTD variable of the frame. The forwarder 118 may perform a store-and-forward frame transfer of the frame to a queue 109 of the time gated scheduler 154 and the time gated scheduler 154 may then schedule the frame for transmission over an output port 152. Alternatively, if the stream gate state for the frame is open during the time period when the frame is received and the stream gate control list 116 indicates that the CTD variable is not set to the predetermined value during the time period when the frame is received, then cut though frame transfer by the forwarder 118 is allowed. The PSFP 108 may associate the setting of the CTD variable with the frame as metadata of the frame. The forwarder 118 may then receive at least a portion of the frame to identify the frame and CTD variable of the frame. The forwarder 118 may perform a cut-through frame transfer mode or store-and-forward frame transfer of the frame by the forwarder 118 to a queue 109 of the time gated scheduler 154 and the time gated scheduler 154 may then schedule the frame for transmission over an output port 152. Based on a setting of the CTD variable, the forwarder 118 allows cut-through frame transfer or only store-and-forward frame transfer. In examples, the CTD variable is set or not set in one or more time periods of the cycle time to improve chances that the time gated scheduler 154 will be able to schedule a frame for transmission in a same cycle time and not a next cycle time. For example, cut-through frame transfer may be allowed when sufficient time exists in the cycle time for the scheduler 112 to schedule frames with the presumed maximum length as indicated by the metadata for transmission at a transmit rate. Alternatively, cut-through frame transfer may be disabled when sufficient time does not exist in the cycle time for the scheduler 112 to schedule frames with the presumed maximum length as indicated by the metadata for transmission at a transmit rate but sufficient time exists to transmit shorter frames with the determined length which is typically less than the presumed maximum length. This way the scheduler 112 may be able to continue to schedule frames for transmission at close to an end of the cycle time, improving frame throughput.

Figure 2:
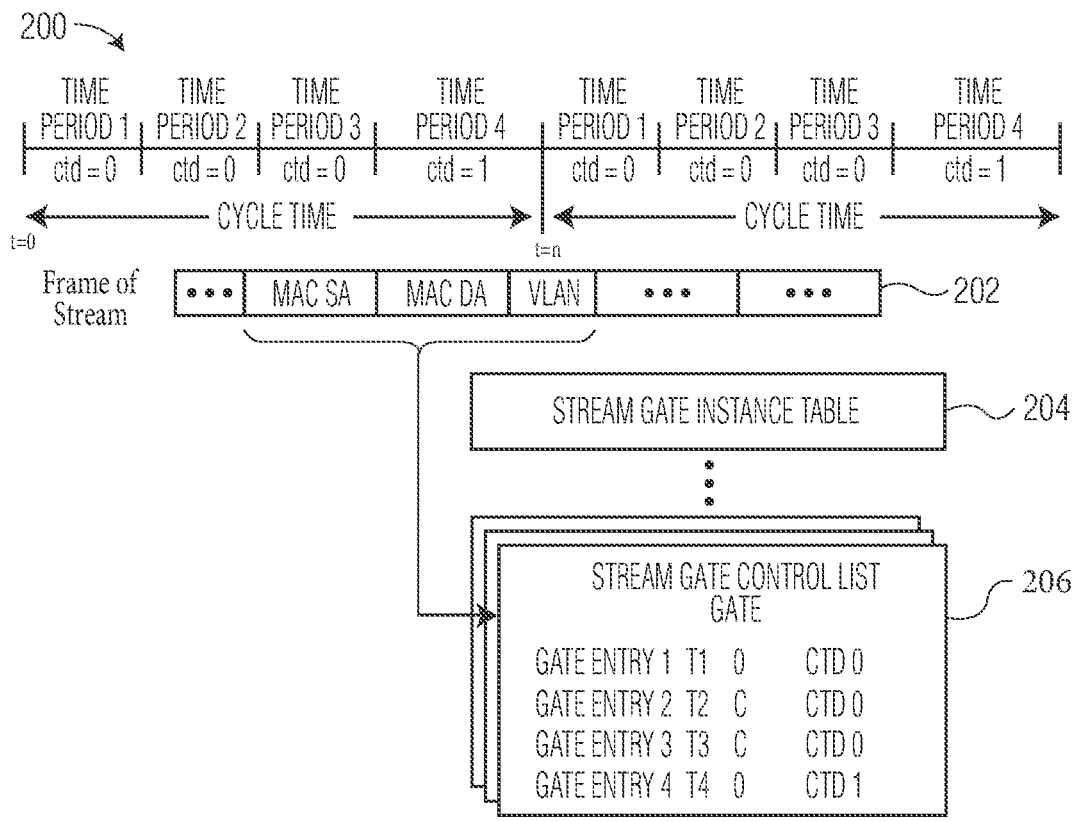
FIG. 2 illustrates example cycle time periods when a frame of a stream is received by the network switch and a data structure for disabling cut-through frame transfer based on the cycle time periods in accordance with an embodiment.

FIG. 2 illustrates an example cycle time 200 of time periods when a frame of a stream is received by the receiver 102 of the network switch 100 and a data structure for disabling cut-through frame transfer based on the cycle time periods in accordance with an embodiment. As discussed above, the cycle time 200 may define a range of time and comprise a plurality of time periods. In an example, a cycle time 200 may begin at time t=0 and end at time t=n, where n is an integer. During each time period, the stream gate state may be open or closed for a stream. In this example, the cycle period 200 may be segmented into four non-overlapping time periods and the stream gate state may be open or closed in each time period for a stream. Further, the cycle time 200 and time periods repeat over time and in each time period in each cycle time 200 the stream gate state may be open or closed. A CTD variable may be defined for each time period and indicate whether cut-through frame transfer is allowed (e.g., CTD=0) or disabled (e.g., CTD=1).

The network switch 100 may have a stream gate instance table 204 of the network switch 100 which comprises a plurality of stream gate control lists. Each stream gate control list may be associated with a stream, an example of which is shown as stream gate control list 206. The stream gate control list 206 may indicate whether the stream gate state is open or closed for a stream in each time period of the cycle time and a CTD variable associated with the time period.

The stream gate control list 206 may have a plurality of gate entries. Each gate entry may identify a time period Tn where n is an integer and whether the stream gate state is open or closed for a stream. The gate control list 206 in the example gate instance table 204 may have four gate entries. In time period one T1 corresponding to gate entry 1, a stream gate state for a stream may be open indicated by "o", in time period two T2 corresponding to gate entry 2, a stream gate state of the stream may be closed indicated by "c", and so on. The stream gate control list 206 may also indicate whether cut-through frame transfer is disabled or allowed for the gate entry. In this example, the CTD variable set to one may indicate that cut-through frame transfer is disabled and the CTD variable set to zero may indicate that cut-through frame transfer is allowed. If the cut-through transfer is disabled, the forwarder 118 may operate in a store- and forward mode for the frame. If the cut-through transfer is allowed, the forwarder 118 may operate in a store- and forward mode or cut-through mode for the frame. In the example, the stream gate control list 206 indicates that gate entry 4 associated with time period 4 has cut-through frame transfer disabled by the CTD variable set to one and the remaining gate entries and associated time periods cut though frame transfer is allowed by the CTD variable set to zero. Other variations are also possible.

The PSFP 108 may access the stream gate instance table 204 and stream gate control lists to determine whether to perform cut-through-transfer or store-and-forward frame transfer of a frame of the stream. In an example, the PSFP 108 may access the stream gate instance table 204 based on the fields in a received frame. Frame 202 is an example of a frame received by the network switch 100 with fields including the MAC source address, MAC destination address, and VLAN identifier. The ingress parser 104 may provide one or more of the MAC source address and MAC destination address to the PSFP 108 which the PSFP 108 uses to identify the stream of the frame 202 and form a pointer to identify the stream gate control list 206 associated with the stream. The receiver 102 may determine a time stamp associated with when the frame 202 was received. The PSFP 106 may use the time of timestamp to identify a gate entry in the stream gate control list 206. For example, the time of the timestamp modulo a duration of the cycle time may be calculated to provide a modulo result. The time period may be a range of times beginning from a start time and ending at an end time within the cycle time. The modulo result may be within the start time and end time of a particular time period which means the frame is received in the time period and is associated with the gate entry of the time period. If the stream gate state is closed for the gate entry, then the PSFP 108 may discard the frame and not provide the frame to the forwarder 108. If the stream gate state is open for the gate entry, then the PSFP 108 may enqueue the frame in a queue 109 of the time gated scheduler 154. The CTD variable in the gate entry associated with the time period when the frame is received indicates whether cut-through frame transfer is disabled and whether the forwarder 108 will operate in a store-and-forward mode or cut-through frame transfer mode for the frame. The CTD variable will be stored as metadata for the frame and the forwarder 118 may access the metadata for the frame when it is received to determine whether to disable cut-through frame transfer for the frame. If the CTD variable indicates to disable cut-through frame transfer, then the forwarder 118 may enqueue the frame to the queue 109 using a store-and-forward frame transfer. If the CTD variable indicates to allow cut-through frame transfer, then the forwarder 118 may enqueue the frame to a queue 109 using a store-and-forward frame transfer or cut-through frame transfer. In this example, the CTD variable set in the last period of the cycle time improves chances that the scheduler 112 will be able to schedule a frame for transmission in a same cycle time and not a next cycle time. Cut-through frame transfer may be disabled because sufficient time does not exist in the cycle time for the scheduler 112 to schedule frames with the presumed maximum length for transmission at a transmit rate but sufficient time exists for the scheduler 112 to transmit shorter frames with the determined length which is typically less than the presumed maximum length.

Figure 3:
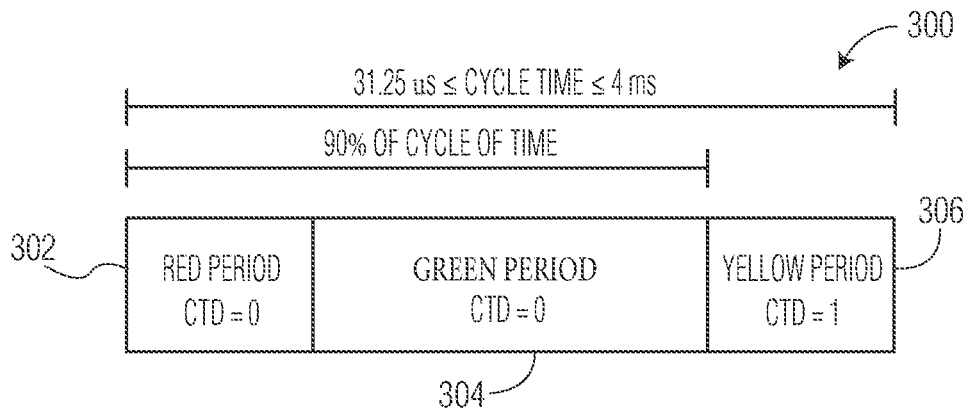
FIG. 3 illustrates example cycle time periods further synchronized with processing of a time gated scheduler of the network switch in accordance with an embodiment.

FIG. 3 illustrates an example cycle time of time periods further synchronized with processing of the time gated scheduler 154 in accordance with an embodiment. A cycle time 300 in this example may be a period time such as ranging from 31.25 microsecs to 4 millisecs during which a stream gate state may be open or closed. The cycle time 300 may be divided into a plurality of periods that are synchronized to time periods when certain priority frames are selected by the scheduler 112 for transmission by the transmitter 114. The plurality of periods may be a red period 302, green period 304, and yellow period 306 defined by IEC 61158-5-10 Industrial Communication Networks Fieldbus Specification section 6.3.13 Virtual Bridges in an example.

The red period 302 may indicate scheduling of higher priority frames in a queue which store the higher priority frames with lower latency requirements. The yellow period or green period 104 may indicate scheduling of lower priority frames in a queue which store the lower priority frames with higher latency requirements.

In an example, cut-through frame transfer may be synchronized with the priority of the frames transmitted. For example, cut-through frame transfer is allowed (CTD=0) in one or more of the time periods, such as during the red period 302 and green period 304 when the scheduler 112 schedules frames in queues 109 which store the high priority frames for transmission to reduce latency of those frames. As another example, cut-through frame transfer is disabled in the yellow period 306 at the end of the cycle time when the scheduler 112 schedules frames in queues 109 which store the lower priority frames for transmission in the cycle time because the actual length of the frames in the queue 109 (e.g., by the metadata) is known for scheduling. If the frame enqueued is indicated as having the maximum frame length, then the scheduler 112 may not schedule the frame for transmission because there may not be enough time in the cycle time to transmit the frame.

A stream gate control list 308 may indicate whether the cut-through frame transfer is performed for frames of a stream. The stream gate control list 308 may be associated with the stream and have a plurality of entries identified as gate entries. Each gate entry may be associated with a time period in the cycle time 300 such as the red period 302, green period 304, and yellow period 306 when a frame of the stream is received. The gate entry may further indicate for the time period whether a stream gate state for the stream is closed or open and whether cut-through frame transfer is performed for the time period. For example, gate entry 3 in gate control list 308 associated with the yellow period 306 has the stream gate state open, the CTD variable is set, and cut-through transfer is disabled while during the red period and green period the stream gate state for the stream is open, CTD variable is not set, and cut-through frame transfer is allowed. The PSFP 108 may access the stream gate control list 308 to determine whether or not to disable cut-through frame transfer for the frame of the stream and provide this indication to the forwarder 118 in the form of metadata associated with the frame.

Example Methods

Figure 4A:
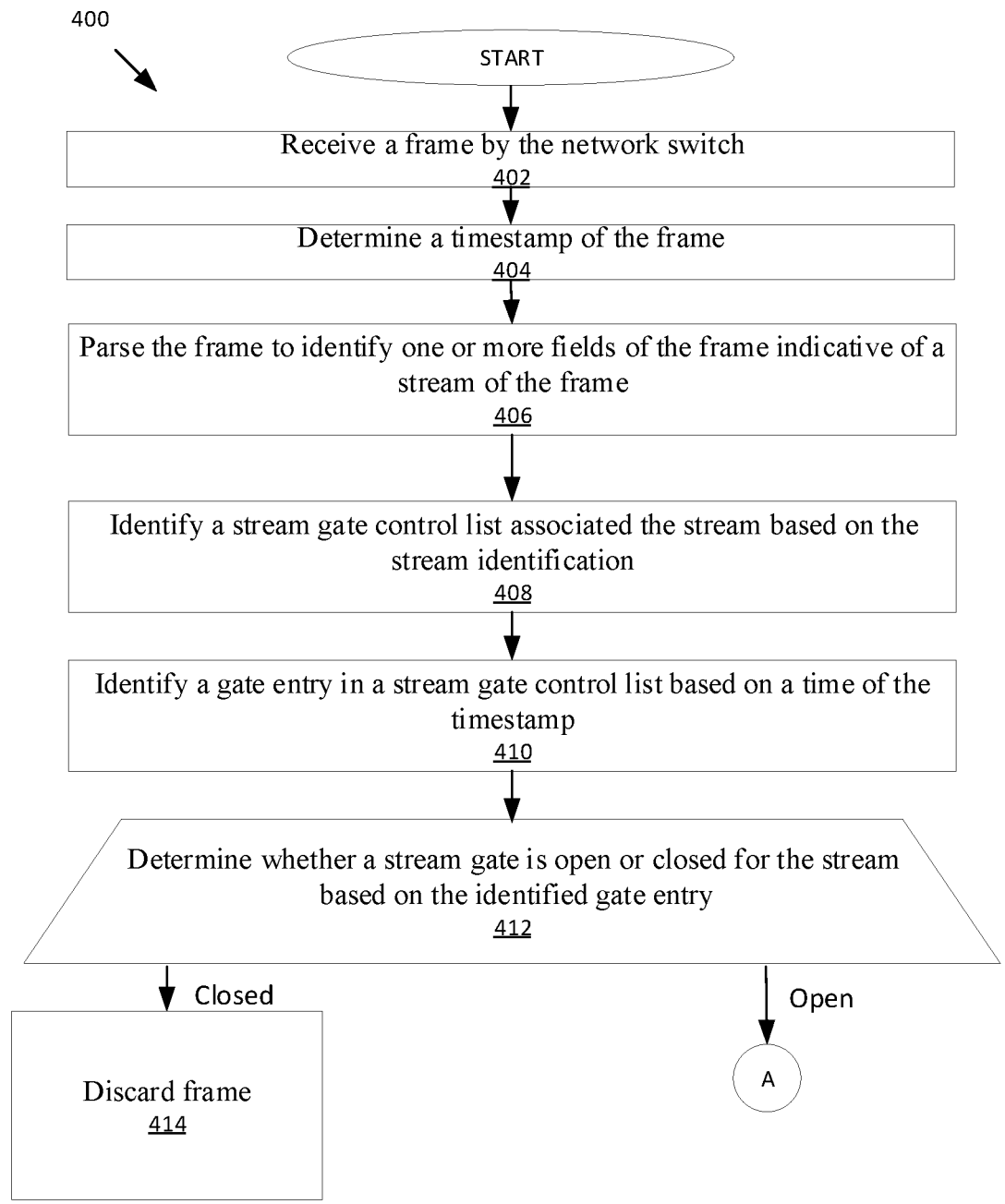
FIGS. 4A and 4B illustrate a flow chart of example functions associated with disabling cut-through frame transfer in accordance with an embodiment.
Figure 4B:
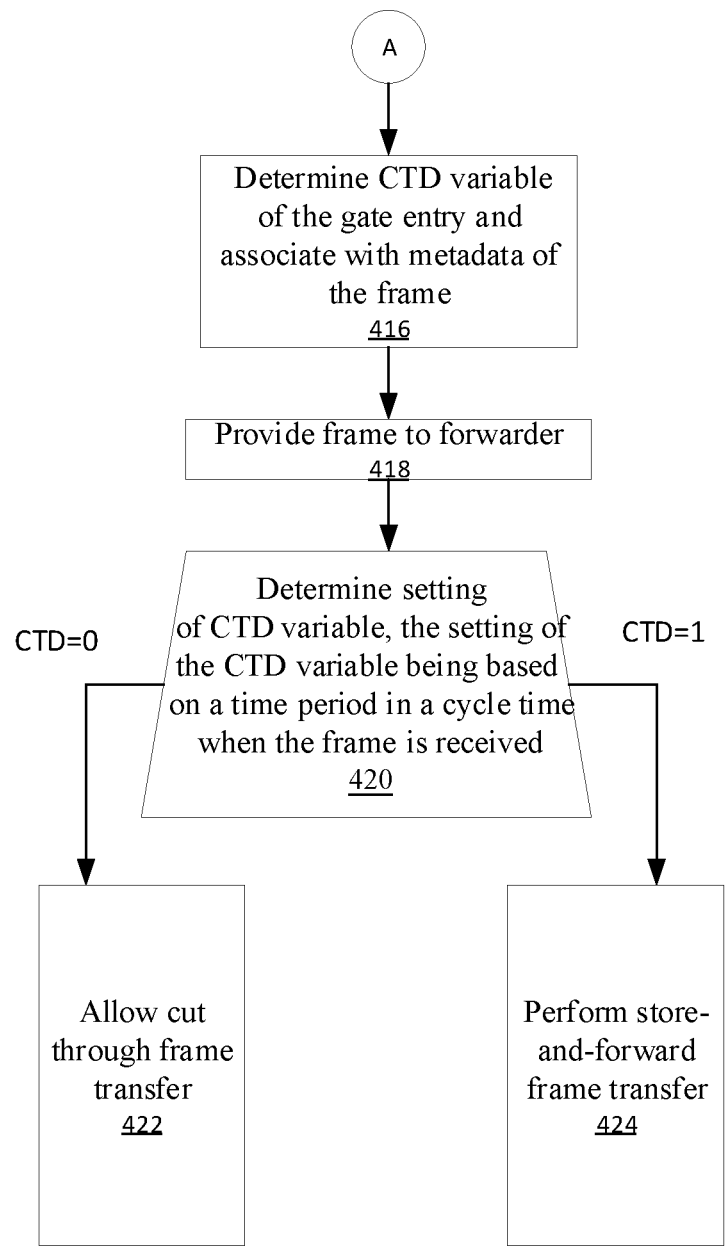

FIGS. 4A & 4B illustrate a flow chart of example functions 400 associated with determining cut-through transfer or store-and-forward frame transfer of a frame in a network switch 100 based on cycle time in accordance with an embodiment. Functions 400 may be performed by one or more of the PSFP 106, forwarder 118, and time gated scheduler 154 of the network switch 100 in an example.

At 402, a frame is received by a receiver 102. The frame is received from an input port 150 by the receiver 102 of the network switch 100. At 404, a time when the frame is received is determined. In an example, the receiver 102 may determine a timestamp of the frame which indicates when the frame was received. At 406, the frame is parsed to identify one or more fields of the frame indicative of a stream of the frame. The fields identified based on the parsing may include a MAC source address, MAC destination address, and VLAN identifier indicative of the stream of the frame. At 408, a stream gate control list associated the stream is identified based on the stream identification. At 410, a gate entry in the stream gate control list is identified based on a time when the frame is received. The time when the frame is received by the network switch 100 is indicated by a timestamp. Further, each gate entry may be associated with a time period. The identified gate entry may be the gate entry with a time period which begins at or before the time when the frame is received by the network switch 100 modulo a duration of the cycle time and ends at or after the time when the frame is received by the network switch 100 modulo the duration of the cycle time. At 412, a determination is made whether a stream gate state is open or closed for the stream based on the identified gate entry. If the gate entry indicates that a stream gate state is closed for the stream, then at 414, the frame is discarded. If the gate entry indicates that a stream gate state is not closed for the stream, then at 416, a CTD variable associated with the gate entry is determined and associated as metadata of the frame. In an example, the stream gate control list may indicate the CTD variable. At 418, the frame is provided to the forwarder 118. At 420, the forwarder 118 determines a setting of the CTD variable. In an example, the CTD variable setting may be indicated by metadata of the frame and based on a time period when the frame is received in a cycle time. If the CTD variable is not set for the frame (e.g., CTD=0), then at 422, cut-through frame transfer is allowed for the frame by the forwarder 118. If the CTD variable is set for the frame (e.g., CTD=1), then at 424, then the forwarder 118 is arranged to perform store-and-forward frame transfer for the frame. The scheduler 112 of the timed gated scheduler 154 may then receive the frame from the queue 109 followed by the transmitter 114 of the network switch 100 transmitting the frame over an output port 152 of the network switch 100.

In one embodiment, a method for performing one of cut-through frame transfer and store-and-forward frame transfer of a frame in an network switch is disclosed. The method comprises: receiving the frame at an input port of the network switch; determining a time period in a cycle time when the frame is received and a stream identification of the frame; and performing one of the cut-through frame transfer and the store-and-forward frame transfer of the frame based on the time period in the cycle time when the frame was received and the stream identification. In an example, a timestamp associated with the frame indicates a time when the frame was received by the network switch and wherein the time period when the frame is received is based on the time of the timestamp. In an example, the method further comprises accessing a data structure stored in the network switch which indicates whether to disable cut-through frame transfer for the frame based on the time period in the cycle time when the frame is received, and wherein performing one of the cut-through frame transfer and the store-and-forward frame transfer of the frame comprises performing the store-and-forward frame transfer when the cut-through frame transfer is disabled. In an example, the method further comprises parsing the frame for an identification of a stream associated with the frame and accessing a data structure stored in the network switch which indicates whether to disable cut-through frame transfer based on the time period and the stream identification, and wherein performing one of the cut-through frame transfer and the store-and-forward frame transfer of the frame comprises performing the store-and-forward frame transfer when the cut-through frame transfer is disabled. In an example, performing one of cut-through frame transfer and store-and-forward frame transfer of the frame based on the time period comprises performing one of cut-through frame transfer and store-and-forward frame transfer of the frame based on a position of the time period within the cycle time. In an example, the store-and-forward frame transfer is performed based on the time period being a last period in the cycle time. In an example, the stream gate state of the network switch is open or closed during a time period. In an example, the method further comprises discarding the frame based on the stream gate state being closed during the time period. In an example, performing one of the cut-through frame transfer and the store-and-forward frame transfer of the frame based on the time period comprises performing one of the cut-through frame transfer and the store-and-forward frame transfer of the frame based on the stream gate state being open during the time period. In an example, cut-through frame transfer comprises enqueuing the frame in a queue of a time gated scheduler before the frame in its entirety is received from the input port. In an example, the store-and-forward frame transfer comprises enqueuing the frame in a queue of a time gated scheduler after the frame in its entirety is received from the input port. In an example, the stream gate state is located in a per stream filter and policer defined in part by an IEEE 802.Qci. In an example, performing one of the cut-through frame transfer and the store-and-forward frame transfer of the frame comprises enqueuing the frame in a queue of a time gated scheduler of the network switch, the time gated scheduler defined by IEEE 802.1Qbv Enhancements for Scheduled Traffic (EST).

In another embodiment, a network switch is disclosed. The network switch comprises: a receiver; a transmitter; a per stream filtering policer (PSFP); a forwarder; a time gated scheduler; wherein the receiver is configured to receive a frame at an input port of the network switch; wherein the PSFP is configured to determine a time period in a cycle time when the frame is received and a stream identification of the frame; wherein the forwarder is configured to perform one of the cut-through frame transfer and a store-and-forward frame transfer of the frame to a queue of the time gated scheduler based on the time period in the cycle time when the frame was received and the stream identification; and wherein the time gated scheduler is configured to provide the frame to a transmitter based on a priority of the frame and a priority gate state of the queue; and the transmitter is configured to transmit the frame over an output port of the network switch. In an example, the PSFP is further configured to access a data structure stored in the network switch which indicates whether to disable cut-through frame transfer for the frame based on the time period in the cycle time when the frame is received. In an example, the time period in the cycle time is synchronized with a time period when the time gated scheduler causes frames of a certain priority to be transmitted. In an example, the forwarder configured to perform one of cut-through frame transfer and store-and-forward frame transfer of the frame based on the time period is further configured to select to perform one of cut-through frame transfer and store-and-forward frame transfer of the frame based on a position of the time period within the cycle time. In an example, the selection of the store-and-forward frame transfer is based on the time period being a last period in the cycle time. In an example, the PSFP is defined in part by IEEE 802.Qci. In an example, the time gated scheduler is defined by IEEE 802.1Qbv.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for performing one of cut-through frame transfer and store-and-forward frame transfer of a frame in a network switch, the method comprising:
   receiving the frame at an input port of the network switch;
   determining, by a per stream forwarder and policer (PSFP), a time period in a cycle time when the frame is received and a stream identification of the frame, wherein the cycle time comprises a plurality of time periods;
   receiving, by a forwarder, the frame from the PSFP which is defined by IEEE 802.Qci based on a stream gate state of the PSFP defined by the stream identification and performing, by the forwarder, one of the cut-through frame transfer and the store-and-forward frame transfer of the frame to a queue of a time gated scheduler which is defined by IEEE 802.Qbv based on the time period in the cycle time when the frame was received and the stream identification, wherein the cut-through frame transfer is always disabled in the last period of the cycle time and store-and-forward frame transfer is performed; and wherein the time gated scheduler provides the frame to a transmitter based on a priority of the frame and a priority gate state of the queue.

2. The method of claim 1, wherein a timestamp associated with the frame indicates a time when the frame was received by the network switch and wherein the time period when the frame is received is based on the time of the timestamp.

3. The method of claim 1, further comprising accessing a data structure stored in the network switch which indicates whether to disable cut-through frame transfer for the frame based on the time period in the cycle time when the frame is received, and wherein performing one of the cut-through frame transfer and the store-and-forward frame transfer of the frame comprises performing the store-and-forward frame transfer when the cut-through frame transfer is disabled.

4. The method of claim 1, further comprising parsing the frame for an identification of a stream associated with the frame and accessing a data structure stored in the network switch which indicates whether to disable cut-through frame transfer based on the time period and the stream identification, and wherein performing one of the cut-through frame transfer and the store-and-forward frame transfer of the frame comprises performing the store-and-forward frame transfer when the cut-through frame transfer is disabled.

5. The method of claim 1, wherein performing one of cut-through frame transfer and store-and-forward frame transfer of the frame based on the time period comprises performing one of cut-through frame transfer and store-and-forward frame transfer of the frame based on a position of the time period within the cycle time.

6. The method of claim 1, wherein the stream gate state of the network switch is open or closed during a time period.

7. The method of claim 6, further comprising discarding the frame based on the stream gate state being closed during the time period.

8. The method of claim 6, wherein performing one of the cut-through frame transfer and the store-and-forward frame transfer of the frame based on the time period comprises performing one of the cut-through frame transfer and the store-and-forward frame transfer of the frame based on the stream gate state being open during the time period.

9. The method of claim 6, wherein cut-through frame transfer comprises enqueuing the frame in the queue of the time gated scheduler before the frame in its entirety is received from the input port.

10. The method of claim 6, wherein the store-and-forward frame transfer comprises enqueuing the frame in flail the queue of flail the time gated scheduler after the frame in its entirety is received from the input port.

11. A network switch comprising:
   a receiver;
   a transmitter;
   a per stream filtering policer (PSFP);
   a forwarder;
   a time gated scheduler;
   wherein the receiver is configured to receive a frame at an input port of the network switch;
   wherein the PSFP is configured to determine a time period in a cycle time when the frame is received and a stream identification of the frame, wherein the cycle time comprises a plurality of time periods;
   wherein the forwarder is configured to receive the frame from the PSFP which is defined by IEEE 802.Qci based on a stream gate state of the PSFP defined by the stream identification; perform one of the cut-through frame transfer and a store-and-forward frame transfer of the frame to a queue of the time gated scheduler which is defined by IEEE 802.Qbv based on the time period in the cycle time when the frame was received and the stream identification, wherein the cut though frame transfer is performed except for a last period of the cycle time and the cut-through frame transfer is always disabled in the last period of the cycle time and store-and-forward frame transfer is performed; and
   wherein the time gated scheduler is configured to provide the frame to a transmitter based on a priority of the frame and a priority gate state of the queue; and the transmitter is configured to transmit the frame over an output port of the network switch.

12. The network switch of claim 11, wherein the PSFP is further configured to access a data structure stored in the network switch which indicates whether to disable cut-through frame transfer for the frame based on the time period in the cycle time when the frame is received.

13. The network switch of claim 11, wherein the time period in the cycle time is synchronized with a time period when the time gated scheduler causes frames of a certain priority to be transmitted.

14. The network switch of claim 11, wherein the forwarder configured to perform one of cut-through frame transfer and store-and-forward frame transfer of the frame based on the time period is further configured to select to perform one of cut-through frame transfer and store-and-forward frame transfer of the frame based on a position of the time period within the cycle time.

\* \* \* \* \*